US008333014B2

(12) United States Patent
Kamikura et al.

(10) Patent No.: US 8,333,014 B2
(45) Date of Patent: Dec. 18, 2012

(54) METHOD OF MANUFACTURING A LIQUID EJECTING HEAD

(75) Inventors: Hiroyuki Kamikura, Shiojiri (JP); Hiroshige Owaki, Okaya (JP); Kazuhide Nakamura, Asahi-mura (JP)

(73) Assignee: Seiko Epson Corporation, Tokyo (JP)

( * ) Notice: Subject to any disclaimer, the term of this patent is extended or adjusted under 35 U.S.C. 154(b) by 550 days.

(21) Appl. No.: 12/566,598

(22) Filed: Sep. 24, 2009

(65) Prior Publication Data

US 2010/0077613 A1 Apr. 1, 2010

(30) Foreign Application Priority Data

Sep. 30, 2008 (JP) ................................ 2008-252662

(51) Int. Cl.
*B21D 53/76* (2006.01)
*B29C 45/14* (2006.01)

(52) U.S. Cl. ........... 29/890.1; 29/841; 29/848; 264/263; 264/275

(58) Field of Classification Search ................. 29/890.1, 29/830, 841, 848; 264/263, 275
See application file for complete search history.

(56) References Cited

U.S. PATENT DOCUMENTS 5,688,460 A * 11/1997 Ruschke ....................... 264/263

FOREIGN PATENT DOCUMENTS

JP 2000-211130 A 8/2000
JP 2002-187291 A 7/2002
JP 2003-080723 A 3/2003
JP 2004-082716 A 3/2004

* cited by examiner

*Primary Examiner* — A. Dexter Tugbang
(74) *Attorney, Agent, or Firm* — Kilpatrick Townsend & Stockton LLP

(57) ABSTRACT

A method for manufacturing a liquid ejecting head is provided. The liquid ejecting head has nozzle openings and ejects liquid supplied through a liquid supply passage from the nozzle openings. The manufacturing method includes: disposing a filtering member between a first supply member and a second supply member, the first supply member having one part of the liquid supply passage formed therein, the second supply member having the other part or another part of the liquid supply passage formed therein, the second supply member being disposed over one surface of the first supply member; and injecting a resin material over the one surface of the first supply member to cover a part of the second supply member for molding a fixation member and fixing the first supply member and the second supply member into a single-piece member as a result of the molding, wherein a convex is formed on a surface of the fixation member in the mold fixation of the first supply member and the second supply member, and a concave is formed in the surface of the fixation member in the mold fixation of the first supply member and the second supply member.

4 Claims, 10 Drawing Sheets

METHOD OF MANUFACTURING A LIQUID EJECTING HEAD

This application claims priority to Japanese Patent Application No. 2008-252,662, filed Sep. 30, 2008, the entirety of which is incorporated by reference herein.

BACKGROUND

1. Technical Field

The present invention generally relates to a liquid ejecting head that ejects liquid, a method for manufacturing a liquid ejecting head, and a liquid ejecting apparatus that is provided with a liquid ejecting head. More particularly, the invention relates to an ink-jet recording head that discharges ink as an example of various kinds of liquid, a method for manufacturing an ink-jet recording head, and an ink-jet recording apparatus that is provided with an ink-jet recording head.

2. Related Art

An ink-jet recording head, which is an example of various kinds of liquid ejecting heads, has the following configuration and ejects ink as follows. Ink is contained in ink cartridges, which are detachably attached to a cartridge case. When the ink cartridges are detachably attached to the cartridge case, ink-supply needles are detachably inserted into the ink cartridges. The ink cartridge is an example of a liquid container. The cartridge case is an example of a liquid supply member. The ink-supply needle is an example of a liquid supply inlet unit. An ink flow passage is formed inside and through each of the ink-supply needle and the supply member. The ink contained in the ink cartridge enters the ink-supply needle and then flows through the ink flow passage. The ink is supplied through the ink flow passage to an ink-ejecting head body. A pressure generating means such as a piezoelectric element or the like is provided in the head body. When the pressure generating means is driven, an ink-ejecting pressure is applied to the ink supplied to the head body. As a result, the ink jet recording head discharges ink from nozzles.

Air bubbles are often present in ink that is contained in an ink cartridge. In particular, air bubbles sometimes form in an ink cartridge at the time of the attachment or detachment thereof. If air bubbles that are present or formed in ink contained in an ink cartridge are entrained with the flow thereof at the time when the ink is supplied from the ink cartridge to the head body of the ink-jet recording head, such entrained air bubbles might reach the head body. As a result, the ink-discharging performance of the ink jet recording head could deteriorate. For example, missing dots, which is an ink-discharging problem, could occur due to the undesirable presence of air bubbles in ink retained inside the head body. In order to provide a technical solution to such a problem, some ink-jet recording heads of the related art have filters for trapping air bubbles, catching foreign objects and particles, and the like. Each of these filters is provided between the corresponding one of a plurality of ink-supply needles and a supply member. An example of such an ink jet recording head of the related art is disclosed in JP-A-2000-211130.

These filters and the supply member are fixed to each other by means of, for example, a heat-sealing technique or other adhesion/deposition technique. The ink-supply needles and the supply member are fixed to each other by means of, for example, an ultrasonic welding technique or other adhesion/deposition technique.

However, if the structure disclosed in JP-A-2000-211130 is adopted, it is necessary to fix the plurality of ink-supply needles to the supply member piece by piece. Since the plurality of ink-supply needles has to be fixed thereto individually, the manufacturing process thereof is not efficient, which increases production costs.

The problems identified above are not unique to an ink-jet recording head. That is, the same problems could also arise in various kinds of liquid ejecting heads.

SUMMARY

An advantage of some aspects of the invention is to provide a liquid ejecting head that makes it possible to reduce production costs. The invention further provides, as an advantage of some aspects thereof, a method for manufacturing such a liquid ejecting head and a liquid ejecting apparatus that is provided with such a liquid ejecting head.

In order to address the above-identified problems without any limitation thereto, a method for manufacturing a liquid ejecting head is provided. The liquid ejecting head has nozzle openings and ejects liquid supplied through a liquid supply passage from the nozzle openings. The manufacturing method according to a first aspect of the invention includes: disposing a filtering member between a first supply member and a second supply member, the first supply member having one part of the liquid supply passage formed therein, the second supply member having the other part or another part of the liquid supply passage formed therein, the second supply member being disposed over one surface of the first supply member; and injecting a resin material over the one surface of the first supply member to cover a part of the second supply member for molding a fixation member and fixing the first supply member and the second supply member into a single-piece member as a result of the molding, wherein a convex is formed on a surface of the fixation member in the mold fixation of the first supply member and the second supply member, and a concave is formed in the surface of the fixation member in the mold fixation of the first supply member and the second supply member.

With such a manufacturing method, it is possible to fix the first supply member and the second supply member to each other simultaneously (where either the first supply member or the second supply member may be made up of a plurality of member elements) by means of the molded fixation member through a single resin injection process in which a resin material is filled. Therefore, it is not necessary to individually fix the first supply member and the second supply member to each other one by one. Thus, it is possible to simplify a manufacturing process to reduce production costs. In addition, since convexes/concaves are formed on/in the surface of the fixation member, it is possible to determine the position of a liquid container or other members and the attachment height thereof with the use of the concaves and the convexes and then attach the liquid container or the like to the first supply member and the second supply member with high attachment precision.

Moreover, since the first supply member and the second supply member are fixed into a single-piece member as a result of the mold formation of the fixation member, it is not necessary to provide individual filter-attachment areas for attaching the filtering member to the first supply member and the second supply member. With such a structure, it is possible to increase the effective filtering area of the filtering member and shorten an interval between each two member elements of the first supply member or the second supply member that are arrayed adjacent to each other. For this reason, it is possible to reduce the size of a liquid ejecting head. Furthermore, since it is not necessary to decrease the area size of the filtering member in order to achieve the head-size reduction, dynamic pressure does not increase. Therefore, it is not necessary to increase a driving voltage, which is used for driving a pressure generation means such as a piezoelectric element, a heating element, or the like. Moreover, the fixation member prevents the formation of a gap between the first supply member and the second supply member. Therefore, the leakage of liquid through the gap would not occur.

In the method for manufacturing a liquid ejecting head according to the first aspect of the invention, it is preferable that the convex and the concave should be formed concurrently with the molding of the fixation member. With such a preferred manufacturing method, since the convex and the concave are formed in the same process as the formation of the fixation member, it is possible to make a series of manufacturing processes simpler in comparison with a case where the convex and the concave are formed in a separate formation process, that is, not concurrently with the molding of the fixation member.

In the method for manufacturing a liquid ejecting head according to the first aspect of the invention, it is preferable that the convex and the concave should be formed after the molding of the fixation member. With such a preferred manufacturing method, it is possible to form the convex at a desired position on the surface of the molded fixation member and the concave at a desired position in the surface of the molded fixation member after the fixation-member molding process.

In the method for manufacturing a liquid ejecting head according to the first aspect of the invention, it is preferable that the fixation member should be molded in such a manner that the liquid supply passage only penetrates through the fixation member. With such a preferred manufacturing method, the fluidity of a resin material improves. The resin material flows without being obstructed and is filled throughout the entire area where the fixation member is to be formed. Thus, it is possible to form the fixation member that has adequate strength in a reliable manner.

BRIEF DESCRIPTION OF THE DRAWINGS

The invention will be described with reference to the accompanying drawings, wherein like numbers reference like elements.

DESCRIPTION OF EXEMPLARY EMBODIMENTS

With reference to the accompanying drawings, exemplary embodiments of the present invention will now be explained in detail.

First Embodiment

Figure 1:
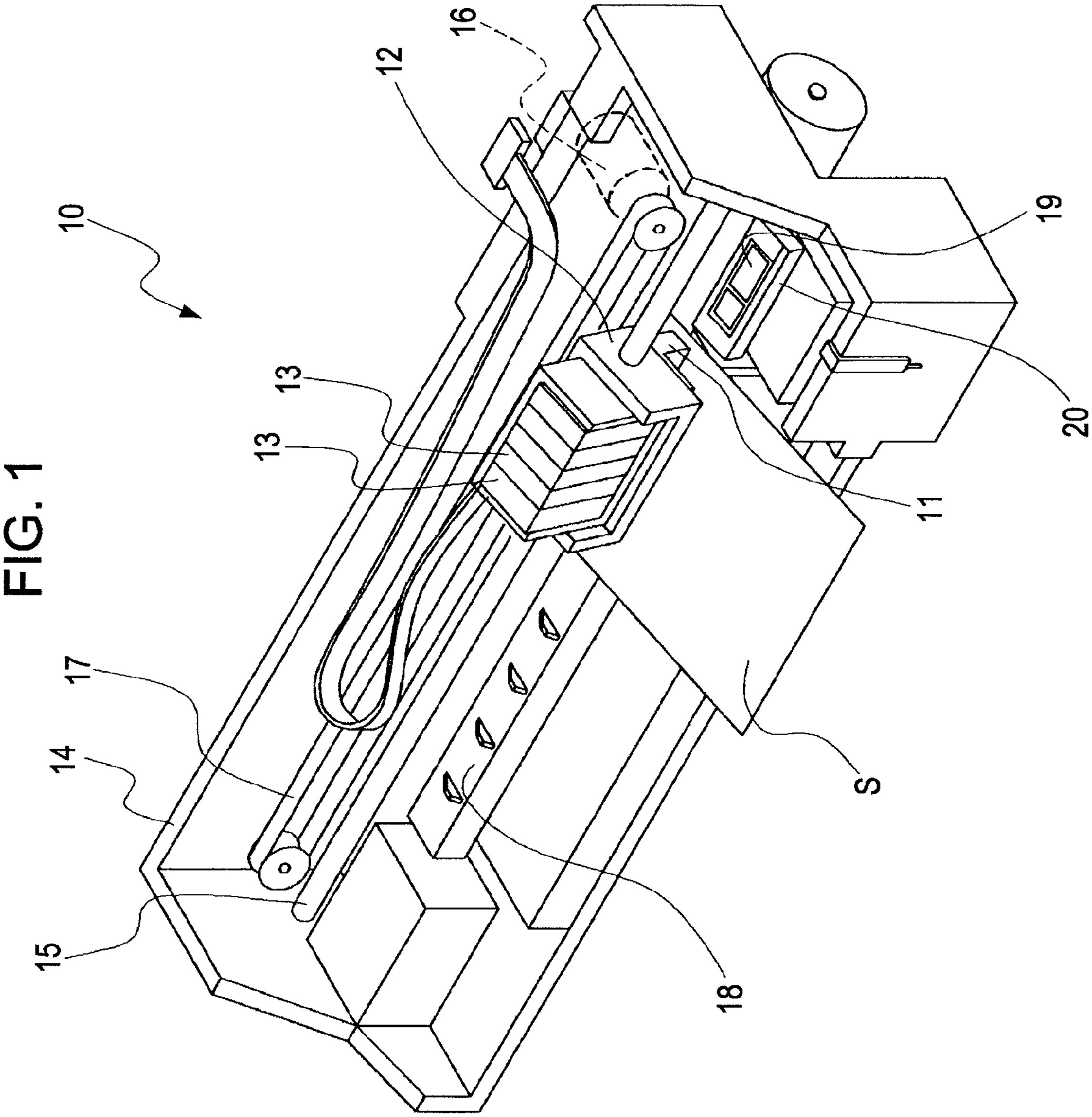
FIG. 1 is a perspective view that schematically illustrates an example of the configuration of a recording apparatus according to a first embodiment of the invention.

FIG. 1 is a perspective view that schematically illustrates an example of the configuration of an ink jet recording apparatus, which is an example of various kinds of liquid ejecting apparatuses according to a first embodiment of the invention. As illustrated in FIG. 1, an ink-jet recording apparatus 10 according to the present embodiment of the invention is provided with an ink jet recording head 11 that discharges ink drops. The ink jet recording head 11 is an example of various kinds of liquid ejecting heads according to an aspect of the invention. The ink jet recording apparatus 10 is further provided with a carriage 12 to which the ink jet recording head 11 is fixed. Ink cartridges 13, each of which constitutes an example of a liquid container according to an aspect of the invention, are detachably attached to the ink-jet recording head 11. Each of these ink cartridges 13 contains ink that has the corresponding one of a set of ink colors, for example, black (B) [K], light black (LB), cyan (C), magenta (M), and yellow (Y). In the following description, the ink jet recording head 11 may be simply referred to as "recording head" 11.

The carriage 12 on which the recording head 11 is mounted is configured to move freely in the axial direction of a carriage shaft 15, which is fixed to an apparatus body chassis 14. As the driving force of a driving motor 16 is transmitted to the carriage 12 through the rotation of a plurality of gears and a timing belt 17, the carriage 12 travels along the carriage shaft 15. Note that the plurality of gears is not illustrated in the drawing. A platen 18 is provided in the apparatus body chassis 14 along the carriage shaft 15. A paper-feeding device or the like, which is not illustrated in the drawing, feeds a recording target medium S such as a sheet of printing paper. The recording target medium S is transported on the platen 18.

A capping device 20 is provided at a position corresponding to the home position of the carriage 12. The home position of the carriage 12 is located at one end area of the carriage shaft 15. The capping device 20 provided in the proximity of the one end area of the carriage shaft 15 includes a capping member 19. The capping member 19 seals the nozzle surface of the recording head 11. The capping member 19 prevents any ink remaining on the nozzle surface of the recording head 11, which has a number of nozzle holes/orifices formed therein, from becoming dried. In addition to the nozzle-surface sealing function described above, the capping member 19 also functions as an ink catcher that catches ink drops at the time of flushing operation.

Figure 2:
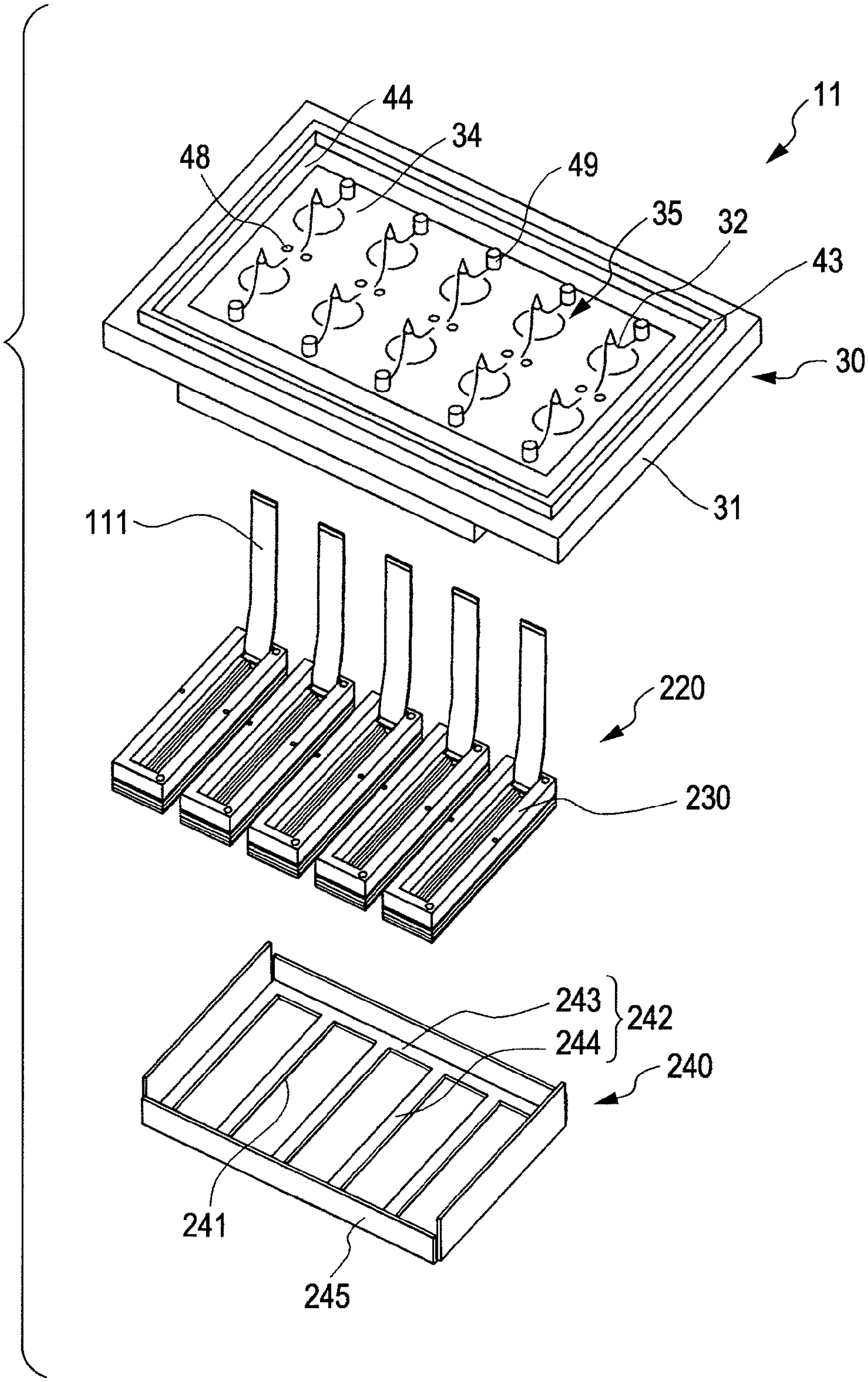
FIG. 2 is an exploded perspective view that schematically illustrates an example of the configuration of a recording head according to the first embodiment of the invention.

In the following description, the configuration of the recording head 11 according to the present embodiment of the invention is explained. FIG. 2 is an exploded perspective view that schematically illustrates an example of the configuration of the ink-jet recording head 11 according to the present embodiment of the invention.

As illustrated in FIG. 2, the recording head 11 includes an ink-supplying member 30, an ink-ejecting head body 220, and a cover head 240. An example of the ink-supplying member 30 is a cartridge case to which the ink cartridges 13 are detachably attached. The head body 220 is fixed to a surface of the ink-supplying member 30 that is opposite to the cartridge-side surface thereof over which the ink cartridges 13 are attached. The cover head 240 is provided at the liquid-ejecting surface side of the head body 220.

Figure 3:
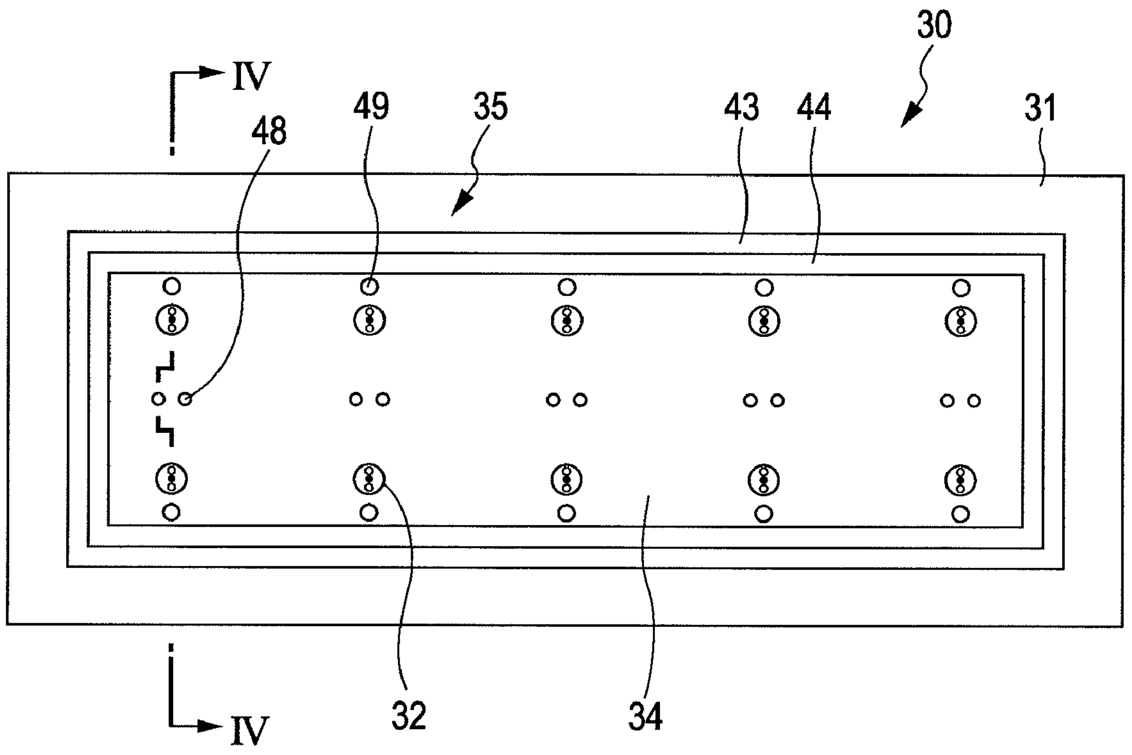
FIG. 3 is a top view that schematically illustrates an example of the structure of a supply member according to the first embodiment of the invention.
Figure 4:
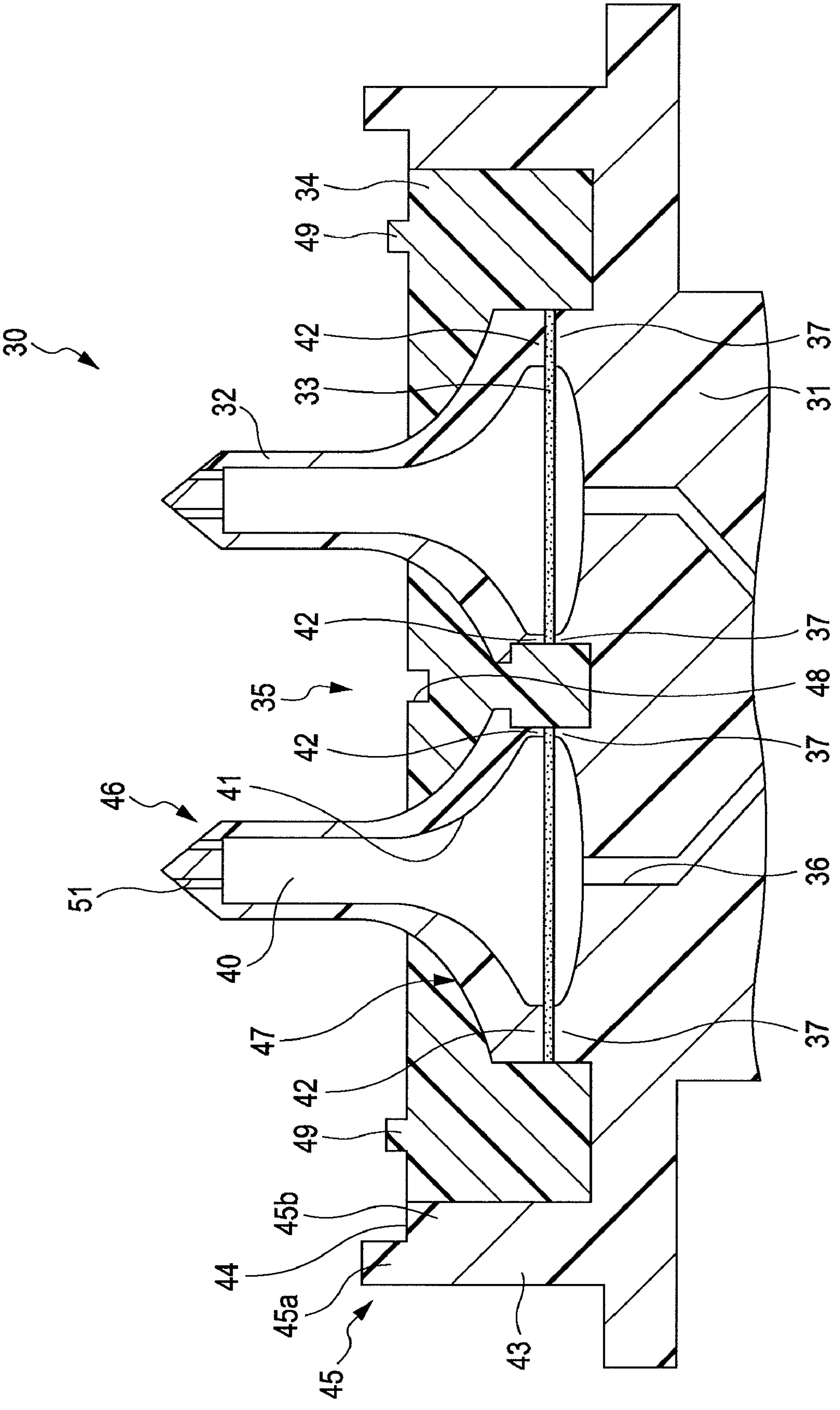
FIG. 4 is a sectional view taken along the line IV-IV of FIG. 3.

First of all, the structure of the supply member 30 is explained in detail below. FIG. 3 is a top view that schematically illustrates an example of the structure of a supply member according to the present embodiment of the invention. FIG. 4 is a sectional view taken along the line IV-IV of FIG. 3.

As illustrated in FIG. 4, the supply member 30 includes a first supply member, a second supply member, a filtering member, and a fixation member. The filtering member is sandwiched between the first supply member and the second supply member. The second supply member is disposed over one surface of the first supply member. The first supply member and the second supply member are fixed to each other by means of the fixation member with the filtering member being sandwiched therebetween. A supply member main body 31, which is provided at a relatively downstream position when viewed along a fluid channel, corresponds to either one of the first supply member and the second supply member. Ink-supply needles 32, each of which is provided at a relatively upstream position when viewed from the downstream supply member main body 31, correspond to the other of the first supply member and the second supply member. It is assumed in the present embodiment of the invention that the supply member main body 31 is the first supply member.

The supply member 30 includes a supply unit formation portion 35 to which each of a plurality of liquid containers such as the ink cartridges 13 is detachably attached over one surface thereof. Though it is explained above that the ink cartridges 13 are directly attached to the supply unit formation portion 35, needless to say, the mode of the supplying of liquid is not limited to the above example. As a modification example, liquid such as ink may be supplied from a liquid container to the supply unit formation portion 35 indirectly through a tube.

The supply member main body 31 has liquid supply passages 36 through which ink supplied from the ink cartridges 13 flows toward the head body 220. The liquid supply passages 36 are formed at relatively downstream positions when viewed from filters 33, which will be explained later. One end of the liquid supply passage 36, which is formed as a through hole inside the supply member main body 31, opens on one surface of the supply member main body 31, or more specifically, the surface of the supply member main body 31 over which the ink-supply needle 32 is provided. The other end of the liquid supply passage 36 opens toward the head body 220. The plurality of liquid supply passages 36 are arrayed to form two lines that extend parallel to each other in the direction of the long sides of the supply member main body 31. The pairs of liquid supply passages 36 are formed as independent passages that are respectively dedicated to the ink cartridges 13 of the corresponding ink colors.

A peripheral area formed around the opening of each liquid supply passage 36 at the one-surface side of the supply member main body 31 functions as a filter-sandwiching area portion 37. Each filter 33 is sandwiched between the filter-sandwiching area portion 37 of the supply member main body 31 and the opposite area portion of the corresponding ink-supply needle 32. The peripheral area formed around the opening of the liquid supply passage 36 is a surrounding area portion formed in the vicinity of the widened opening thereof, and thus, in the vicinity of an opposite filtering chamber 41. It is preferable to form the peripheral area as close as possible to the opening for saving space.

A bank portion 43 is formed as a part of the supply member main body 31 on the one surface thereof outside an area at which a fixation portion 34 is to be formed. The bank portion 43 is formed to surround the fixation portion formation area. A stepped surface portion 45 is formed as a level difference in the top surface of the bank portion 43. The step portion 45 is made up of an upper step portion 45*a*, which is a raised portion, and a lower step portion 45*b*. The upper step portion 45*a* is formed as the outer part of the step portion 45. The lower step portion 45*a* is formed as the inner part of the step portion 45. The upper surface of the lower step portion 45*b* functions as a metal mold placement surface 44. A metal mold (i.e., mold form or formwork) is placed on the metal mold placement surface 44 in the process of manufacturing the fixation portion 34. A more detailed explanation of the molding of the fixation portion 34 will be given later.

Except for the filter-sandwiching area portion 37, the inner surface area of the supply member main body 31 that is embanked by the surrounding bank portion 43 is formed as a substantially flat surface. Since the inner area is formed as a flat surface, a fluid resin material flows smoothly thereon without being trapped, blocked, or obstructed in any other way due to the presence of an uneven surface at the time when the resin material is injected for the formation of the fixation portion 34. Therefore, it is ensured that the resin material is filled inside the bank portion 43 without leaving a gap.

The ink-supply needle 32, which is fixed at the one-surface side of the supply member main body 31, has a tip portion 46. The ink-supply needle 32 further has a flared base portion 47. The width (i.e., diameter) of the flared base portion 47 increases toward the bottom thereof. A needle-side liquid supply passage 40 is formed inside the ink-supply needle 32. The needle-side liquid supply passage 40 is in communication with an ink inlet hole 51 that is formed through the tip portion 46. The needle-side liquid supply passage 40 is in communication with liquid supply passage 36 with the filter 33 being interposed therebetween. The needle-side liquid supply passage 40 includes the filter chamber 41. The filter chamber 41 is an inner wide space whose diameter increases toward the liquid supply passage 36. The filter-side opening of the filter chamber 41 functions as a liquid supply port Ink supplied from the ink cartridge 13 flows through the liquid supply port to be further supplied to the supply member main body 31.

A filter-sandwiching area portion 42 is formed as the bottom surface of the ink-supply needle 32. The filter-sandwiching area portion 42 of the ink-supply needle 32 is provided opposite to the filter-sandwiching area portion 37 of the supply member main body 31. The filter 33 is sandwiched between the filter-sandwiching area portions 37 and 42.

The filter 33 is formed as, for example, a sheet of metal that is woven to have a fine mesh structure. The filter 33 is attached to the supply member main body 31 by means of, for example, a heat sealing technique or other adhesion/deposition technique and then sandwiched between the supply member main body 31 and the ink-supply needle 32. In the structure of the supply member 30 according to the present embodiment of the invention, the filter 33 has a size that fits in a filter-sandwiching area formed by the supply member main body 31 and the ink-supply needle 32. The filter 33 may be attached to the ink-supply needle 32.

The fixation portion 34 is provided at the one-surface side of the supply member main body 31. The fixation portion 34 covers a part of the ink-supply needle 32, thereby fixing the supply member main body 31 and the ink-supply needle 32 to each other. The fixation portion 34 is made of resin. The fixation portion 34 is formed by means of an integral molding method. The meaning of "the fixation portion 34 covers a part of the ink-supply needle 32" is as follows. The fixation portion 34 covers at least a region near the perimeter of the filter-sandwiching area at which the filter 33 is sandwiched between the supply member main body 31 and the ink-supply needle 32. In addition, the fixation portion 34 is provided in such a manner that at least the ink inlet hole 51 of the ink-supply needle 32 is exposed. Since the fixation portion 34 covers at least a region near the perimeter of the filter-sandwiching area, it is possible to prevent the leakage of ink from the main-body-side liquid supply passage 36 and the needle-side liquid supply passage 40 to the outside. Moreover, since the fixation portion 34 does not cover the ink inlet hole 51, the fixation portion 34 does not obstruct the supply of ink from the ink cartridge 13 to the ink-supply needle 32.

In the structure of the supply member 30 according to the present embodiment of the invention, the fixation portion 34 covers a region near the perimeter of the filter-sandwiching area portion 37 of the supply member main body 31 and further covers the flared base portion 47 of the ink-supply needle 32. In addition, the fixation portion 34 is formed in such a manner that a needle body including the tip portion 46 of each ink-supply needle 32 protrudes from the covered base portion 47 thereof without being covered by the fixation portion 34. Since the fixation portion 34 is provided as explained above, the supply member main body 31 and the ink-supply needles 32 are fixed to each other. In addition, it is possible to prevent the leakage of ink from any of the main-body liquid supply passages 36 and the needle-side liquid supply passages 40 to the outside.

As a non-limiting example of a concave according to an aspect of the invention, position determination concave portions 48 are formed in the surface of the fixation portion 34. In addition, as a non-limiting example of a convex according to an aspect of the invention, height adjustment convex portions 49 are formed on the surface of the fixation portion 34. More specifically, the position determination concave portion 48 is a recess that is formed in the surface of the fixation portion 34. Two position determination concave portions 48 are formed at a center area between one of each pair of the ink-supply needles 32 arrayed next to each other when viewed along the short sides of the supply member main body 31 and the other thereof. The height adjustment convex portion 49 is a small projection that is formed on the surface of the fixation portion 34. Each height adjustment convex portion 49 is provided at an outer position opposite to inner positions where two position determination concave portions 48 are formed with the ink-supply needle 32 being provided therebetween. Two height adjustment convex portions 49 are formed for each pair of the ink-supply needles 32. The height of one of these two height adjustment convex portions 49 measured from the surface of the fixation portion 34 is the same as that of the other.

Figure 5:
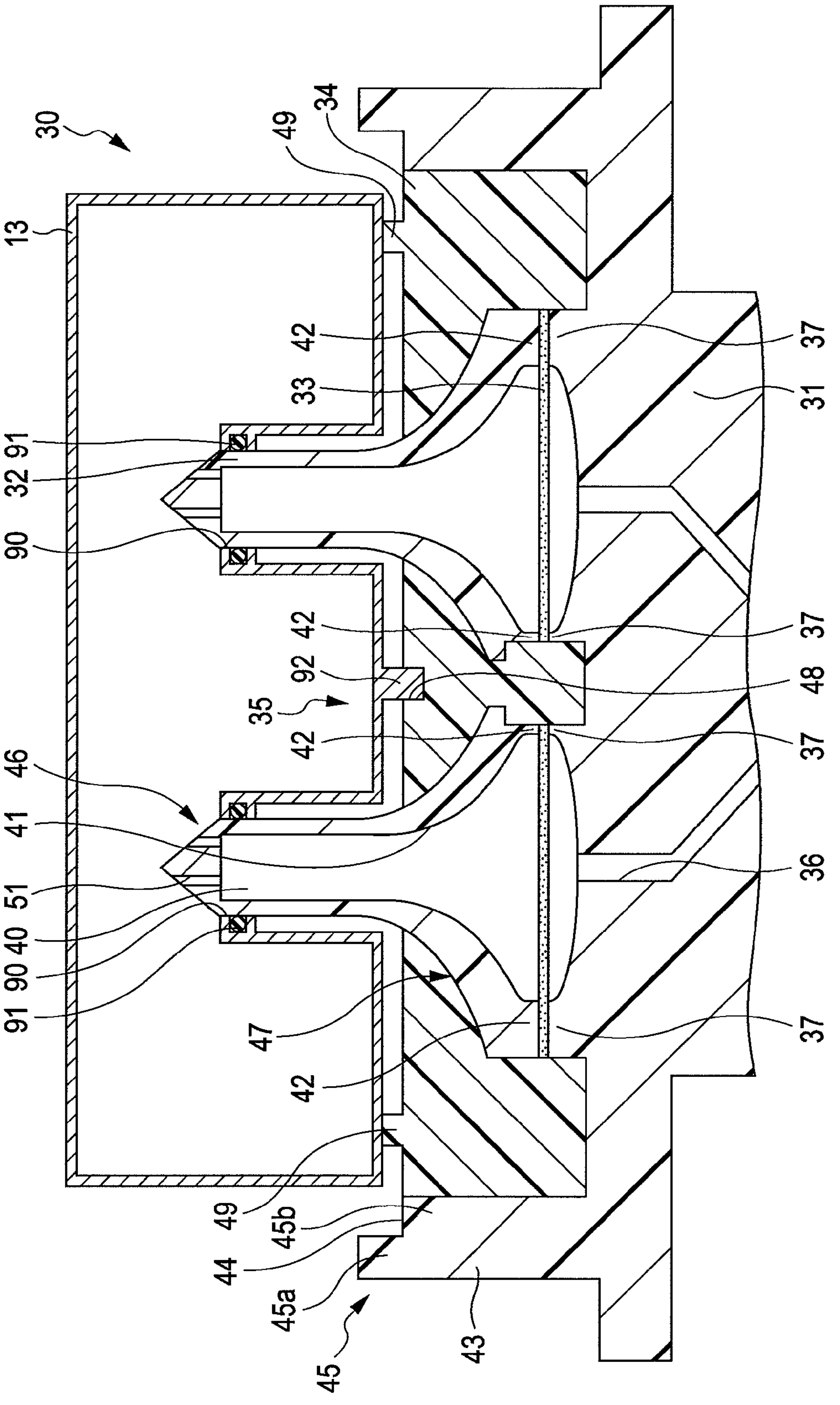
FIG. 5 is a sectional view that schematically illustrates an example of the structure of a supply member according to the first embodiment of the invention to which an ink cartridge is attached.

The position determination concave portions 48 and the height adjustment convex portions 49 are used for determining the plan position and the height of the ink cartridge 13 or the like when the ink cartridge 13 is detachably attached to the supply unit formation portion 35. FIG. 5 is a sectional view that schematically illustrates an example of the structure of a supply member according to the present embodiment of the invention to which the ink cartridge 13 is attached. As illustrated in FIG. 5, needle insertion openings 90 are formed through the needle-side surface of the ink cartridge 13. When the ink cartridge 13 is attached to the supply member 30 with the needle-side surface facing downward, the tip portions 46 of the ink-supply needles 32 are inserted through the openings 90, respectively. In such an attachment state, the ink inlet holes 51 formed through the tip portions 46 are in communication with the inner ink-containing space of the ink cartridge 13. More specifically, the tip portions 46 of the ink-supply needles 32 are inserted through O-shaped rings 91, which are formed at the circumference of the openings 90 of the ink cartridge 13. Since the tip portions 46 fit into the O-shaped rings 91, it is possible to prevent ink from leaking through the openings 90.

Position determination pins 92 are formed on the bottom surface of the ink cartridge 13. The position determination pins 92 are inserted in the position determination concave portions 48. The insertion of the position determination pins 92 into the position determination concave portions 48 makes it possible to attach the ink cartridge 13 to the supply unit formation portion 35 at a predetermined attachment position. In addition, the height adjustment convex portions 49 are in contact with the bottom surface of the ink cartridge 13. That is, when the ink cartridge 13 is attached to the supply member 30, the ink cartridge 13 is pressed toward the fixation portion 34 until the bottom surface thereof is brought into contact with the height adjustment convex portions 49. By this means, it is possible to attach the ink cartridge 13 to the supply member 30 at a predetermined attachment height, that is, while leaving a predetermined distance from the surface of the fixation portion 34.

The concaves formed in the fixation portion 34 are not limited to be used for determining the attachment position of the ink cartridge 13. The convexes formed on the fixation portion 34 are not limited to be used for determining the attachment height of the ink cartridge 13. For example, when the ink cartridge 13 is not directly attached to the supply member 30 but provided at a distant position from which ink is supplied to the liquid supply passage 40 through a tube, the concaves may be used for determining the attachment position of a relay supply member that feeds ink coming through the tube to the ink-supply needle 32. In such a case, the convexes can be used for determining the attachment height of the relay supply member. The size of the convexes and concaves, the number thereof, the position thereof, and the depth thereof are not limitedly specified herein. Accordingly, the size, the number, the position, and the depth thereof may be arbitrarily determined depending on a member that is to be attached to the supply unit formation portion 35.

As explained above, the supply member main body 31 and the ink-supply needles 32 with the filters 33 being sandwiched therebetween are fixed to each other by means of the fixation portion 34, which is formed by integral molding. The plurality of ink-supply needles 32 is fixed to the supply member main body 31 in a single fixation process at the same time. That is, it is not necessary to fix ink-supply needles to a supply member main body piece by piece. Therefore, it is possible to reduce production costs.

In addition, since the position determination concave portions 48 are formed in the surface of the fixation portion 34, it is possible to determine the position of the ink cartridge 13 or the like relative to the position of the supply unit formation portion 35 accurately and attach the ink cartridge 13 to the supply member 30 with greater positional precision. Moreover, since the height adjustment convex portions 49 are formed on the surface of the fixation portion 34, it is possible to determine the attachment height of the ink cartridge 13 with greater precision.

Furthermore, in contrast to a related-art structure according to which it is necessary to provide welding/attachment areas in a supply member main body so that ink-supply needles and filters can be individually welded/attached thereat, these welding/attachment areas are not necessary in the structure of the recording head 11 according to the present embodiment of the invention because the supply member main body 31 and the ink-supply needles 32 with the filters 33 being sandwiched therebetween are fixed to each other by means of the fixation portion 34. With such a structure, an interval between each two ink-supply needles 32 arrayed adjacent to each other is shortened, which makes it possible to reduce the size of the recording head 11. Moreover, since the reduction in the size of the recording head 11 can be achieved by reducing the array pitch of the ink-supply needles 32, it is not necessary to decrease the area size of each filter in order to achieve the head-size reduction. If the area size of each filter is decreased, dynamic pressure increases. Therefore, it is necessary to increase a driving voltage, which is used for driving a pressure generation means such as a piezoelectric element, a heating element, or the like. In contrast, in the present embodiment of the invention, since it is not necessary to decrease the area size of each filter in order to achieve the head-size reduction, dynamic pressure does not increase. Therefore, it is not necessary to increase a driving voltage.

In a related-art structure, a supply member main body and ink-supply needles are fixed to each other by welding. In such a method, there is a possibility that a gap is formed therebetween. If the gap exists, ink might leak through the gap. In contrast, since the supply member main body 31 and the ink-supply needles 32 are fixed to each other by means of the fixation portion 34 in the structure of the recording head 11 according to the present embodiment of the invention, the risk of the formation of a gap therebetween is substantially smaller, which makes it possible to avoid the leakage of ink through the gap. Even if any gap were formed therebetween, though it is substantially less likely to occur, the leakage of ink through the gap would not occur because the fixation portion 34 covers the gap.

Next, a method for manufacturing the ink jet recording head 11, especially, a method for manufacturing the supply member 30, is explained in detail below. Each of FIGS. 6 and 7 is a sectional view that schematically illustrates an example of a method for manufacturing a supply member according to an exemplary embodiment of the invention.

Figure 6:
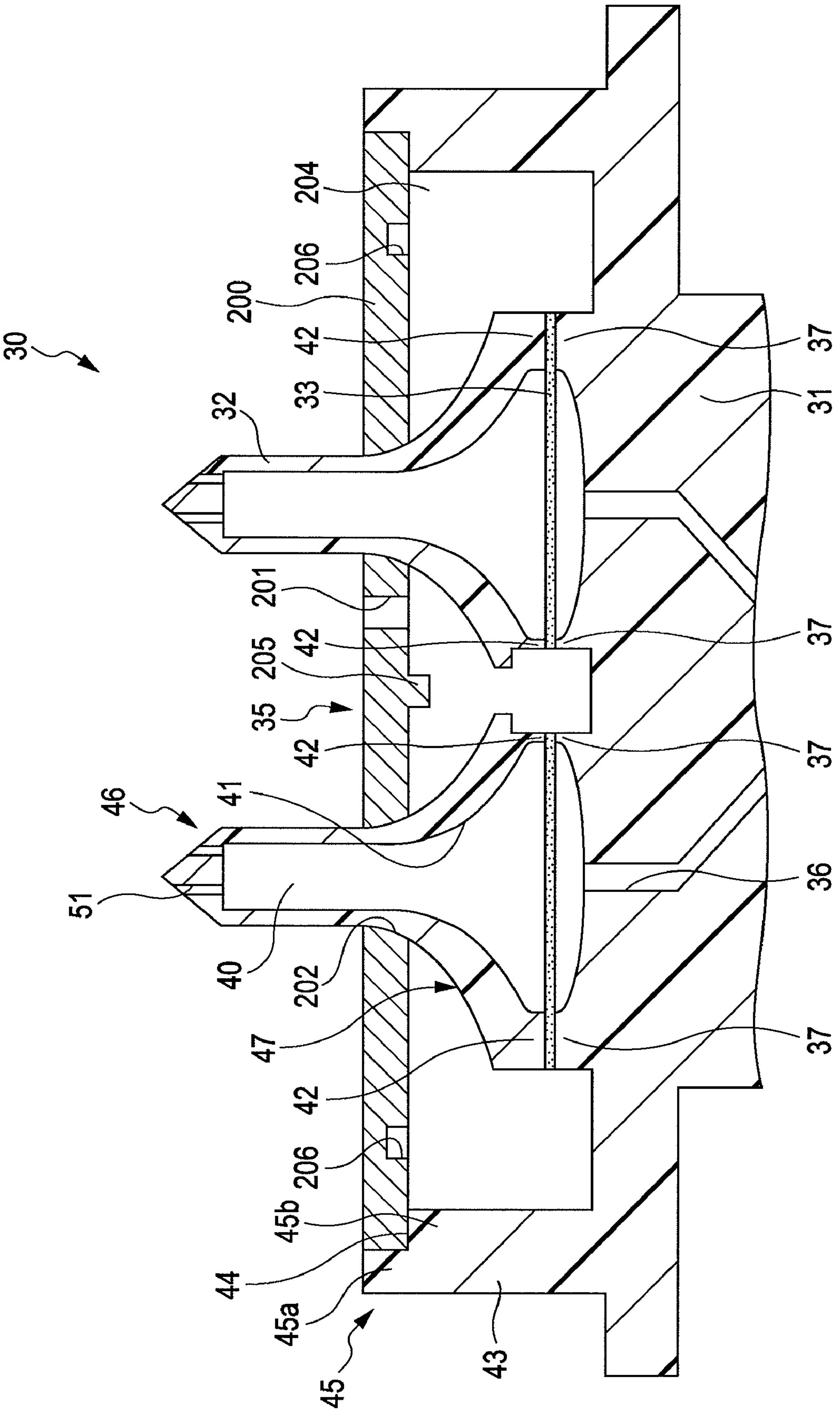
FIG. 6 is a sectional view that schematically illustrates an example of a method for manufacturing a supply member according to the first embodiment of the invention.
Figure 7:
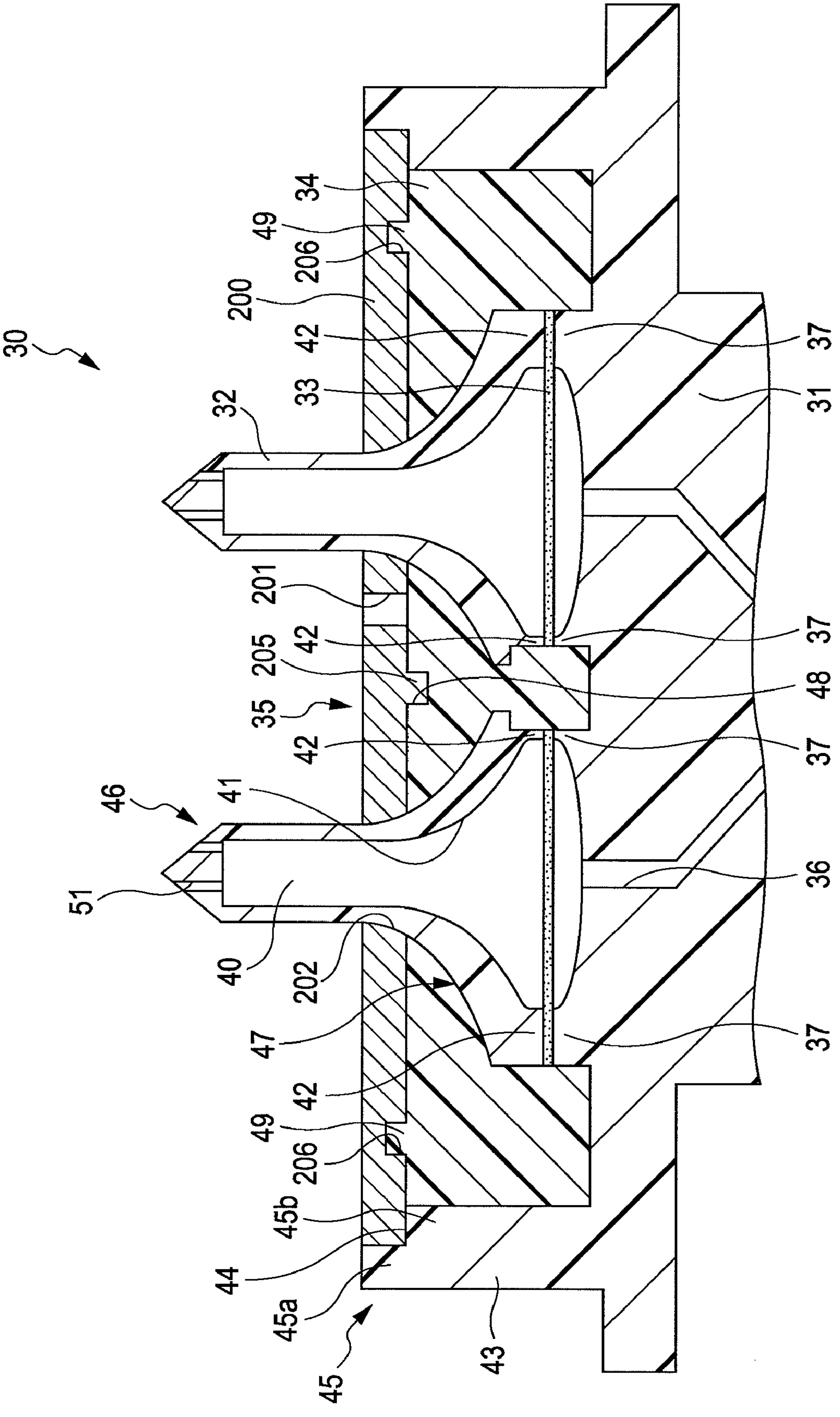
FIG. 7 is a sectional view that schematically illustrates an example of a method for manufacturing a supply member according to the first embodiment of the invention.

As a first step, as illustrated in FIG. 6, the filters 33 are placed on the filter-sandwiching area portion 37 of the supply member main body 31. The circumferential area of each filter 33 is attached to the filter-sandwiching area portion 37. Next, the ink-supply needles 32 are placed on the filters 33 so that the filters 33 are sandwiched between the filter-sandwiching area portion 37 of the supply member main body 31 and the filter-sandwiching area portion 42 of the ink-supply needles 32. With the filters 33 being sandwiched therebetween, a metal mold 200 is placed on the metal mold placement surface 44 of the bank portion 43.

As its name indicates, the metal mold 200 is made of metal. The metal mold 200 has a shape that fits with the inner surface of the upper step portion **45*a* of the bank portion 43. When the metal mold 200 is placed on the metal mold placement surface 44 of the bank portion 43, the metal mold 200 seals a space inside the bank portion 43. That is, the supply member main body 31, the bank portion 43, and the metal mold 200 create an inner space 204. The metal mold 200 has through holes 202. The ink-supply needles 32 are inserted through the through holes 202 when the metal mold 200 is placed on the metal mold placement surface 44. A needle body including the tip portion 46 of each ink-supply needle 32 protrudes through the through hole 202 of the metal mold 200, whereas the flared base portion 47 thereof lies under the lower surface of the metal mold 200, that is, inside the inner space 204. A resin injection gate 201 is formed through the metal mold 200. A fluid resin material is injected through the gate 201. A mold form or a formwork made of a material other than metal may be used as a substitute for the metal mold 200 as long as the mold form seals the inner space 204**.

Convex portions 205 are formed on the lower surface of the metal mold 200. The convex portions 205 of the metal mold 200 are formed at positions corresponding to positions where the position determination concave portions 48 of the fixation portion 34 are to be formed. In addition, concave portions 206 are formed in the lower surface of the metal mold 200. The concave portions 206 of the metal mold 200 are formed at positions corresponding to positions where the height adjustment convex portions 49 of the fixation portion 34 are to be formed.

As illustrated in FIG. 7, a fluid resin material is injected through the gate 201 into the inner space 204 so as to form the fixation portion 34 by integral molding, thereby manufacturing the supply member 30. Specifically, a molten resin material is filled into the inner space 204 through the gate 201 of the metal mold 200 to be molded into the fixation portion 34. As a result, the fixation portion 34 covers the flared base portion 47 of the ink-supply needle 32 and fixes the ink-supply needles 32 to the supply member main body 31 with the filters 33 being sandwiched therebetween to form a single-piece integrated member.

Since the concave portions 206 are formed in the lower surface of the metal mold 200, some resin material flows into the concave portions 206 of the metal mold 200 in the resin filling process and then hardens into the height adjustment convex portions 49, the formation of which is carried out concurrently with the formation of the fixation portion 34. In addition, since the convex portions 205 are formed on the lower surface of the metal mold 200, the position determination concave portions 48 are formed at the same time as the formation of the fixation portion 34. Since the position determination concave portions 48 and the height adjustment convex portions 49 are formed in the same process as the formation of the fixation portion 34, it is possible to make a series of manufacturing processes simpler in comparison with a case where the position determination concave portions 48 and/or the height adjustment convex portions 49 are formed in a separate formation process.

As explained earlier, the inner surface area of the supply member main body 31 that is embanked by the surrounding bank portion 43 is formed as a substantially flat surface except for the filter-sandwiching area portion 37. In addition, a resin material is injected into the inner space 204 with a needle body including the tip portion 46 of each ink-supply needle 32 protruding through the through hole 202 of the metal mold 200. Therefore, it is possible to form the fixation portion 34 in such a manner that the ink-supply needles 32 only penetrate through the fixation portion 34. The meaning of "the ink-supply needles 32 only penetrate through the fixation portion 34" is that no member/portion that penetrates through the fixation portion 34 is formed as a part of the supply member main body 31. Though the supply member main body 31 may have some convex portion that is low enough so as not to penetrate through the fixation portion 34, it is preferable that the inner surface area of the supply member main body 31 should be formed as a flat surface without a surface level difference except for the filter-sandwiching area portion 37.

Since the fixation portion 34 is formed in such a manner that the ink-supply needles 32 only penetrate through the fixation portion 34, it is possible to fill a resin material that is injected through the gate 201 into the space 204 without a filling failure. A more detailed explanation of such an advantage is given below with reference to FIG. 8.

Figure 8A:
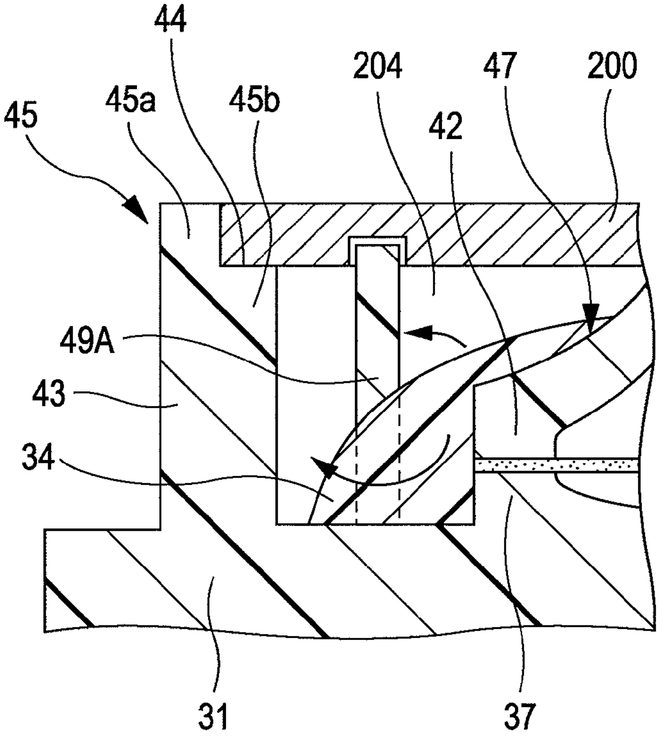
FIGS. 8A and 8B are a set of essential-part cross section views that schematically illustrates an example of the fluidity of a resin material that flows on a supply member.
Figure 8B:
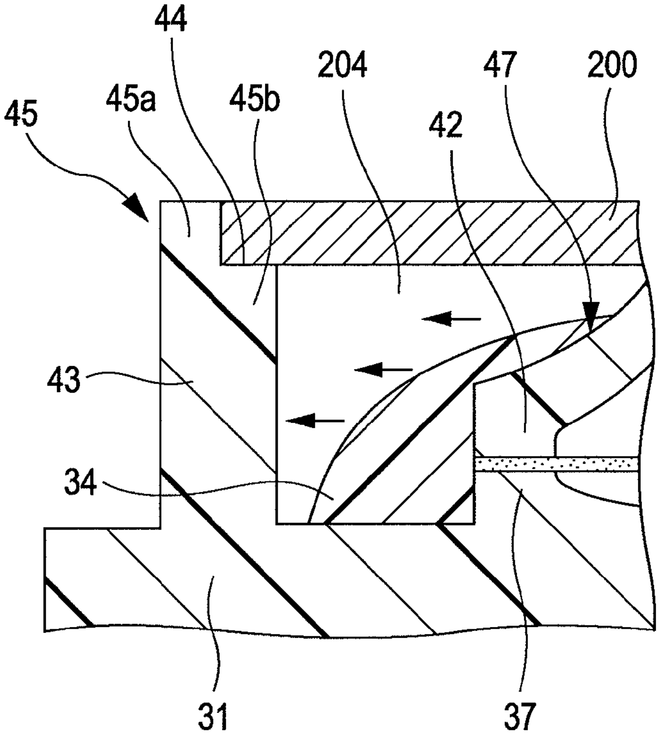

FIGS. 8A and 8B are a set of essential-part cross section views that schematically illustrates an example of the fluidity of a resin material that flows on a supply member. For the purpose of explanation, it is assumed here that a height adjustment convex portion 49A is provided on the supply member main body 31 as illustrated in FIG. 8A. The height adjustment convex portion 49A is formed to penetrate through the fixation portion 34 when a resin material is filled into the space 204 so that the tip portion of the height adjustment convex portion 49A protruding through the fixation portion 34 is in contact with the ink cartridge 13. If such a structure is adopted, the flow of the resin material (fixation portion 34) injected through the gate 201 of the metal mold 200 is obstructed by the height adjustment convex portion 49A. For this reason, there is a risk that the resin material is not filled sufficiently at, for example, a space between the bank portion 43 and the height adjustment convex portion 49A. Such poor resin filling might result in the formation of a fragile fixation portion 34 that lacks strength.

In contrast, as illustrated in FIG. 8B, no member/portion that penetrates through the fixation portion 34 is formed as a part of the supply member main body 31 according to the present embodiment of the invention. That is, the inner surface area of the supply member main body 31 is formed as a flat surface without a surface level difference except for the filter-sandwiching area portion 37. Therefore, the resin material (fixation portion 34) injected through the gate 201 of the metal mold 200 flows smoothly without being obstructed to reach the inner surface of the bank portion 43. Thus, it is possible to fill a resin material into the space 204 without a filling failure.

In the foregoing description of the present embodiment of the invention, the ink-supply needle 32 is mentioned as an example of a member that penetrates through the fixation portion 34. However, the scope of the invention is not limited to such an exemplary structure. The structure can be modified in various ways with liquid supply passages (or a member that constitutes liquid supply passages) only penetrating through the fixation portion 34.

Since the supply member 30 is manufactured as explained above, it is possible to fix the plurality of ink-supply needles 32 to the supply member main body 31 simultaneously through a single resin injection process in which a resin material is filled into the space 204. Therefore, it is not necessary to weld the plurality of ink-supply needles 32 to the supply member main body 31 one by one. Thus, it is possible to simplify a manufacturing process to reduce production costs.

Since the metal mold 200 is placed on the metal mold placement surface 44 of the bank portion 43, it is possible to prevent a resin material injected into the space 204 from flowing over the bank portion 43 to leak out of the space 204. Specifically, if the upper surface of a bank portion were formed as a flat surface on which the metal mold 200 is placed, a resin material would flow over the flat upper surface when it leaks out of the space 204. In contrast, with the structure explained above in which the metal mold 200 is placed on the metal mold placement surface 44 of the bank portion 43, a resin material is less likely to leak out because it has to surmount the upper step portion 45*a* before leakage. Therefore, the injection pressure of a resin material can be increased without causing the leakage thereof, thereby making it possible to fill the resin material into and throughout the entire space 204 without leaving a filling gap. By this means, it is possible to form the fixation portion 34 that fixes the ink-supply needles 32 to the supply member main body 31 securely to make up a single-piece integrated member.

Moreover, since the space 204 is formed as a result of placing the metal mold 200 on the metal mold placement surface 44, the metal mold 200 absorbs the heat of a resin material that is filled in the space 204. Therefore, the deformation of the ink-supply needles 32 due to the heat of the resin material does not occur.

Furthermore, the filters 33 are pre-attached to the supply member main body 31 before being sandwiched between the supply member main body 31 and the ink-supply needles 32. Therefore, the positional displacement of the filters 33 does not occur when fixed by the fixation portion 34. If the position of the filter 33 were shifted, the needle-side liquid supply passage 40 would be in communication with the main-body liquid supply passage 36 without the filter 33 being interposed therebetween at a correct position. Accordingly, in such a case, impurities would flow into the main-body liquid supply passage 36 without being trapped by the filter 33. This does not occur because the filters 33 are pre-welded thereto.

The head body 220 is provided in communication with the other end of each liquid supply passage 36 of the supply member 30 that is opposite to the one end thereof that is in communication with the corresponding ink-supply needle 32.

Figure 9:
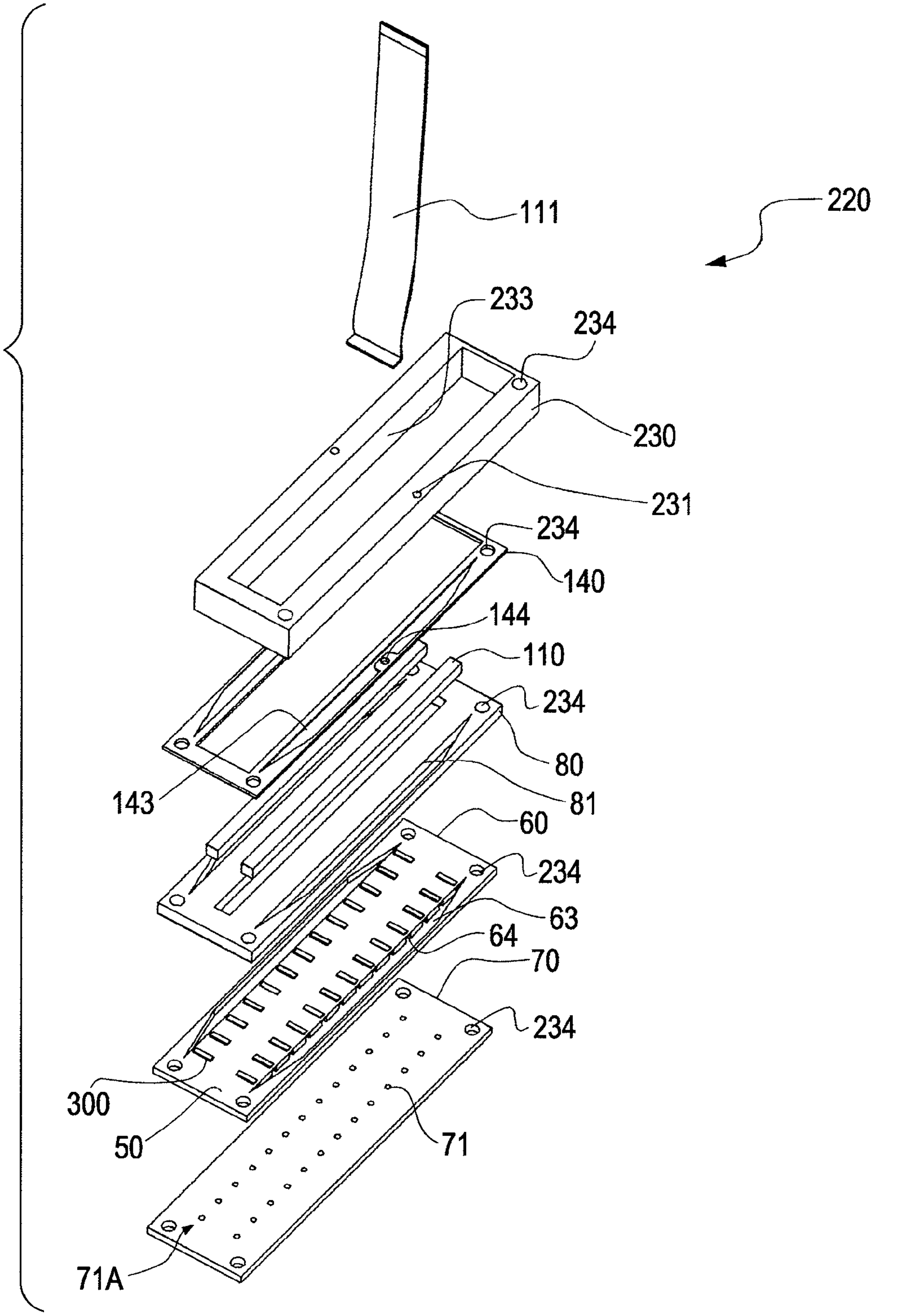
FIG. 9 is an exploded perspective view that schematically illustrates an example of the configuration of a head body according to the first embodiment of the invention.
Figure 10:
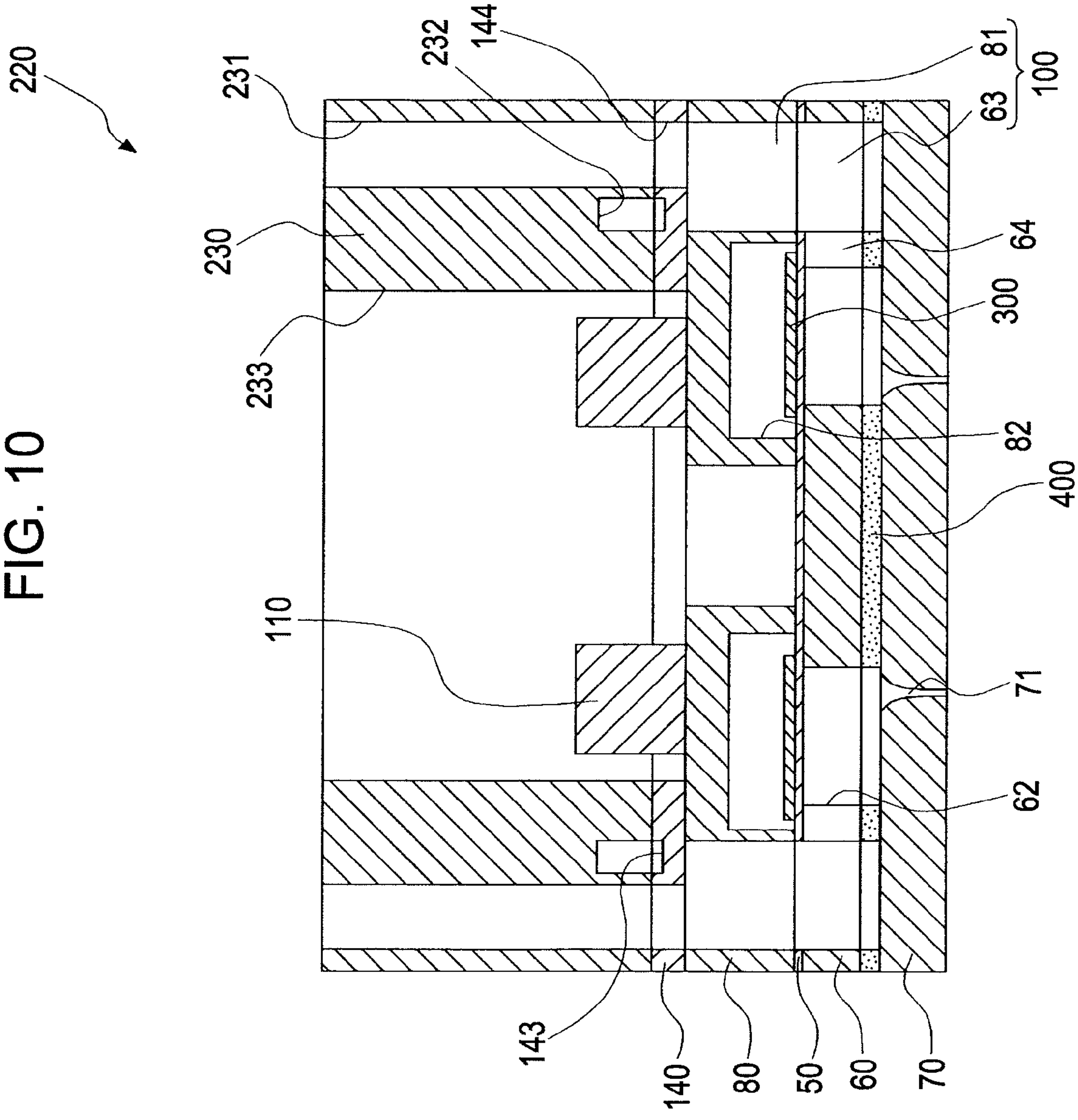
FIG. 10 is a sectional view that schematically illustrates an example of the structure of a head body according to the first embodiment of the invention.

Next, the structure of the head body 220 is explained below. FIG. 9 is an exploded perspective view that schematically illustrates an example of the configuration of a head body according to the present embodiment of the invention. FIG. 10 is a sectional view that schematically illustrates an example of the structure of the head body illustrated in FIG. 9.

A fluid channel formation substrate 60 that constitutes a part of the head body 220 is made of silicon single crystal. As illustrated in these drawings, an elastic membrane 50, which is made of silicon dioxide, is formed on one surface of the fluid channel formation substrate 60. A plurality of pressure generation chambers 62 is formed in the fluid channel formation substrate 60. A plurality of partition walls demarcates the pressure generation compartments 62. Two lines of the pressure generation chambers 62, viewed in the width direction of the fluid channel formation substrate 60, are formed therein. By employing an anisotropic etching technique, the pressure generation chambers 62 are formed from the opposite side of the fluid channel formation substrate 60. A communicating portion 63 is formed at an area outside each array of pressure generation chambers 62, viewed in the longitudinal direction thereof. Each of the communicating portions 63 is in communication with a reservoir portion 81 that is provided in a reservoir formation substrate 80 that will be explained later. Being in communication with each other, the communicating portion 63 and the reservoir portion 81 constitute a reservoir 100, which serves as a common ink chamber/compartment for each of the pressure generation chambers 62. The communicating portion 63 is in communication with the "longitudinal-direction-one-end-portion" of each of the pressure generation chambers 62 via an ink supply passage 64. That is, in the structure of the head body 220 according to the present embodiment of the invention, the pressure generation chamber 62, the communicating portion 63, and the ink supply passage 64 constitute a fluid channel (i.e., liquid flow passage) formed in the fluid channel formation substrate 60.

A nozzle plate 70 is bonded to the opening surface of the fluid channel formation substrate 60 by means of an adhesive 400. A plurality of nozzle holes 71 is bored through the nozzle plate 70. A plurality of nozzle plates 70 is provided so as to correspond to a plurality of head bodies 220. Each nozzle plate 70 has an area size that is slightly larger than an exposure opening area 241 of the cover head 240, which will be explained in detail later. The nozzle plates 70 are fixed to the cover head 240 with the use of an adhesive or the like at overlapping areas. Each nozzle opening 71 of the nozzle plate 70 is in communication with one end of the corresponding pressure generation chamber 62 that is opposite to the other end that is in communication with the ink supply passage 64. In the present embodiment of the invention, two lines of the pressure generation chambers 62 are formed next and parallel to each other in the fluid channel formation substrate 60. Accordingly, two nozzle lines 71A, which are a pair of lines of the nozzle openings 71 formed next and parallel to each other, are provided in each of the plurality of head bodies 220. In addition, in the present embodiment of the invention, the surface at which these nozzle holes 71 of the nozzle plate 70 open to the outside constitutes a liquid-ejecting surface thereof. The nozzle plate 70 is made of, for example, a silicon single crystal substrate, metal such as stainless steel (SUS), or the like.

An elastic membrane 50 is formed on the other surface of the fluid channel formation substrate 60 that is opposite to the opening surface thereof. Piezoelectric elements 300 are formed on the elastic membrane 50. The piezoelectric element 300 includes a lower electrode film that is made of metal, a piezoelectric substance layer that is made of a piezoelectric material such as lead zirconate titanate (PZT) or the like, and an upper electrode film that is made of metal. The lower electrode film, the piezoelectric substance layer, and the upper electrode film are laminated in the order of appearance herein to make up the piezoelectric element 300.

The reservoir formation substrate 80 having the reservoir portion 81 that constitutes at least a part of the reservoir 100 is bonded to the fluid channel formation substrate 60 over which the piezoelectric elements 300 are formed. In the present embodiment of the invention, the reservoir portion 81 is formed through the reservoir formation substrate 80 in a thickness direction thereof while extending in the width direction of the pressure generation chambers 62. As explained earlier, the reservoir portion 81 is in communication with the communicating portion 63 of the fluid channel formation substrate 60 in such a manner that the reservoir portion 81 and the communicating portion 63 constitute the reservoir 100, which serves as a common ink chamber/compartment for each of the pressure generation chambers 62.

A piezoelectric-element housing portion 82 is provided at an area opposite to each of the piezoelectric elements 300 of the reservoir formation substrate 80. The piezoelectric-element housing portion 82 has some space that is wide enough so as not to obstruct the motion of the piezoelectric element 300.

A driving circuit 110 is provided on the reservoir formation substrate 80. The driving circuit 110 drives each piezoelectric element 300. The driving circuit 110 is, for example, a semiconductor integrated circuit (IC). Each terminal of the driving circuit 110 is connected to a line that is drawn out from an individual electrode of each piezoelectric element 300 via a bonding wire or the like, which is not shown in the drawing. The terminals of the driving circuit 110 are connected to an external device via an external wiring 111 made of a flexible printed cable (FPC) or the like. Through the external wiring 111, the driving circuit 110 receives various kinds of signals including but not limited to a printing signal from the external device connected thereto.

A compliance substrate 140 is bonded to the reservoir formation substrate 80. An ink induction port 144 is formed through the compliance substrate 140 in a thickness direction thereof. The ink induction port 144 is formed at some part of a reservoir area of the compliance substrate 140, which is an area opposite to the reservoir 100. The ink induction port 144 is provided to supply ink to the reservoir 100. The remaining part of the reservoir area of the compliance substrate 140 opposite to the reservoir 100, that is, the part of the reservoir area where the ink induction port 144 is not formed, is formed as a flexible portion 143 having a relatively smaller thickness. The flexible portion 143 seals the reservoir 100. The flexible portion 143 gives compliance inside the reservoir 100.

A head case 230 is provided on the compliance substrate 140.

An ink supply communicating passage 231 is formed through the head case 230. One end of the ink supply communicating passage 231 is in communication with the liquid supply passage 36 of the supply member 30. The other end of the ink supply communicating passage 231 is in communication with the ink induction port 144. Ink supplied from the supply member 30 flows through the ink supply communicating passage 231 to be supplied to the ink induction port 144. A gutter portion 232 is formed in the head case 230 at an area opposite to the flexible portion 143 of the compliance substrate 140. With such a structure, the flexible portion 43 can become deflected. The head case 230 has a driving circuit encasing portion 233, which is formed by boring a hollow cavity through the head case 230 in a thickness direction thereof, at an area opposite to the driving circuit 110 provided on the reservoir formation substrate 80. The external wiring 111 passes through the driving circuit encasing portion 233 to be electrically connected to the driving circuit 110.

Each of members/components that make up the head body 220 described above is provided with pin insertion holes 234, which are formed at two of four corners thereof. The pin insertion holes 234 are holes through which pins are to be inserted for the positional determination of these members/components at the time of assembly thereof. These members/components are bonded together while determining the relative positions thereof by inserting pins through the pin insertion holes 234. As a result, the head body 220 is assembled as a single-piece integrated unit.

As illustrated in FIG. 2, the cover head 240 is attached to five head bodies 220, which are mounted to the supply member 30 with the same number of head cases 230 being interposed therebetween. The cover head 240 has an open-topped-box-like shape and covers the periphery of each of the liquid ejecting surfaces of the head bodies 220. The cover head 240 has a function of determining the relative positions of these head bodies 220. The cover head 240 has the exposure opening areas 241 and an attachment portion 242. The nozzle holes 71 of the nozzle plates 70 are exposed through the exposure opening areas 241. The attachment portion 242 demarcates each exposure opening area 241. The attachment portion 242 is attached to the liquid ejecting surfaces of the head bodies 220 at least at two end areas opposite to each other. The nozzle lines 71A of the nozzle openings 71 formed next and parallel to each other are formed between the two end areas.

In the present embodiment of the invention, the attachment portion 242 is made up of a frame portion 243 and beam portions 244. The frame portion 243 is a peripheral frame that encloses the liquid ejecting surfaces of the head bodies 220. Each of the beam portions 244 extends between two head bodies 220 mounted next to each other in such a manner that these beam portions 244 divide an inner area into the exposure opening areas 241. The frame portion 243 and the beam portions 244 are attached to the liquid ejecting surfaces of the head bodies 220. In other words, the frame portion 243 and the beam portions 244 are attached to the surfaces of the nozzle plates 70.

The cover head 240 further has a sidewall portion 245. The sidewall portion 245 is formed by bending a cover head material in such a manner that each part thereof extends from the peripheral edge of the liquid ejecting surface along the side of the head bodies 220.

As explained above, the attachment portion 242 of the cover head 240 is attached to the liquid ejecting surfaces of the head bodies 220. With such a structure, it is possible to make a difference in level between the liquid ejecting surfaces of the head bodies 220 and the cover head 240 relatively small. Since the level difference therebetween is small, it is further possible to prevent any ink from remaining on the liquid ejecting surfaces thereof when wiping operation, suction operation, or the like, is performed. In addition, since each of the beam portions 244 of the cover head 240 covers a gap between two head bodies 220 fixed adjacent to each other, it is possible to prevent ink from infiltrating through the gap between these two adjacent head bodies 220. For this reason, the components of the head body 220 such as the piezoelectric elements 300, the driving circuit 110, and the like are protected from otherwise possible degradation or damage due to ink infiltration. Moreover, since the liquid ejecting surfaces of the head bodies 220 are bonded to the cover head 240 by means of an adhesive with no gap left therebetween, it is possible to prevent a recording target medium S such as a sheet paper from entering therebetween, that is, getting pinched or jammed therebetween. Thus, the deformation of the cover head 240 and paper jam malfunction do not occur. In addition, it is possible to prevent the overflow/infiltration of ink over/into the side surfaces of the head bodies 220 securely because the sidewall portion 245 of the cover head 240 completely covers the outer edges of the head bodies 220. Moreover, since the cover head 240 has the attachment portion 242 that is bonded to the liquid ejecting surfaces of the head bodies 220, when bonding is performed, it is possible to determine the position of each pair of the nozzle lines 71A of the plurality of head bodies 220 with high positional precision with respect to the cover head 240.

An example of the material of the cover head 240 is a metal such as stainless steel. The cover head 240 may be manufactured by press-working a metal plate, or alternatively, by metal-forming thereof. The cover head 240 can be grounded if an electrically conductive metal material is employed. The method of the attachment of the cover head 240 to the nozzle plates 70 is not limited to the bonding explained above. When the cover head 240 is bonded to the nozzle plates 70, for example, a thermosetting epoxy adhesive, an ultraviolet hardening-type (UV cure) adhesive, or the like may be used.

The ink jet recording head 11 according to the present embodiment of the invention having the structure explained above operates as follows. Ink supplied from the ink cartridge 13 enters the needle-side liquid supply passage 40. Then, the ink flows through the main-body-side liquid supply passage 36, the ink supply communicating passage 231, and the ink induction port 144 in the order of appearance herein. The inner fluid channel structure from the reservoir 100 to the nozzle orifices 71 is filled with the supplied ink. Thereafter, in accordance with a recording signal sent from the driving circuit 110, a voltage is applied to each piezoelectric element 300 provided for the corresponding pressure generation chamber 62 so as to deflect and deform the elastic membrane 50 and the piezoelectric element 300. By this means, the inner pressure of each of the pressure generation chambers 62 is raised; and as a result thereof, an ink drop is discharged from the corresponding nozzle hole 71.

Variant Embodiments

Although an exemplary embodiment of the invention is explained above, the scope of the invention as well as the basic configuration thereof is in no case limited to the specific embodiment/examples described above.

For example, the structures of the first supply member and the second supply member are not limited to those of the exemplary embodiment described above. It is assumed in the foregoing exemplary embodiment of the invention that the supply member main body 31 and the ink-supply needles 32 correspond to the first supply member and the second supply member, respectively. However, the correspondence may be reversed. That is, the first supply member may be the ink-supply needle 32, which means that the second supply member is the supply member main body 31. In addition, though it is assumed in the foregoing exemplary embodiment of the invention that the entire supply member main body 31 constitutes the first supply member, the first supply member may be embodied as a part of the supply member main body 31. Specifically, the supply member main body 31 may be split into a filter-side (33) member and a head-body-side (220) member, with the first supply member being embodied as the filter-side (33) member. The filter-side (33) member is fixed to the ink-supply needles 32 to make up an integrated member. Then, the head-body-side (220) member is fixed to the integrated member to make up the supply member 30.

In the foregoing description of an exemplary embodiment of the invention, it is explained that the ink cartridge 13, which is an example of a liquid container, is detachably attached to the supply member 30. However, the structure explained above can be modified in various ways. For example, an ink tank or the like may be provided not on the recording head 11 but at a remote position away from the recording head 11 as a liquid container. The liquid container may be connected through a liquid conduit such as a tube or the like to the recording head 11. That is, although the ink-supply needle 32 is taken as an example of a liquid supply inlet unit in the foregoing description of an exemplary embodiment of the invention, the liquid supply inlet unit is not limited to a needle member.

In the foregoing description of an exemplary embodiment of the invention, it is explained that each head body 220 is provided for more than one liquid supply passage 36. As a modification thereof, more than one head body may be provided for each ink color. For example, each liquid supply passage 36 may be in communication with a head body. Each liquid supply passage 36 may be in communication with the corresponding one of a plurality of parallel lines of nozzle holes formed in a head body. Needless to say, it is not always necessary for each liquid supply passage 36 to be in communication with the corresponding one of a plurality of parallel lines of nozzle holes formed in a head body. Each liquid supply passage 36 may be in communication with a plurality of parallel lines of nozzle holes formed in a head body. Each line of nozzle holes may be divided into two groups. In such a modified configuration, each liquid supply passage 36 is in communication with the corresponding group of nozzle holes formed in a head body. That is, the invention is applicable as long as the liquid supply passage 36 is in communication with a nozzle-opening group that is made up of a plurality of nozzle openings.

Though it is explained above that the bank portion 43 that includes the stepped surface portion 45 is formed as a part of the supply member main body 31, it is not always necessary to form the step portion 45 as a part of the bank portion 43. That is, a stepped portion may be formed as a part of the metal mold 200. For example, a raised surface portion that is elevated toward the supply member main body 31 may be formed as a part of the metal mold 200. A non-elevated area part of the metal mold 200 is placed in contact with the top surface of the bank portion 43. In such a modified structure, the elevated surface portion of the metal mold 200, the inner surface of the bank portion 43, and the supply member main body 31 create the inner space 204. As another modification example, the supply member main body 31 may not include the bank portion 43. In such a modified structure, it is the metal mold 200 only that functions as the enclosure of the space 204 For example, a metal mold may have the shape of a box with one open surface, for example, with an open bottom so that the inner surfaces of the metal mold and the surface of the supply member main body 31 demarcate the space 204.

It is explained above that the position determination concave portions 48 and the height adjustment convex portions 49 are formed in the same process as the integral-molding formation of the fixation portion 34. However, it is not always necessary to form the position determination concave portions 48 and the height adjustment convex portions 49 concurrently with the formation of the fixation portion 34. For example, the fixation portion 34 having a flat surface may be formed first by an integral molding method, followed by the formation of concaves as a result of the removal of a part of the flat surface of the fixation portion 34 and the formation of convexes as a result of additional mounding of a resin on the flat surface of the fixation portion 34. It is not necessary for the fixation portion 34, convexes, and concaves to be made of the same resin material. Different materials may be used for the formation thereof.

In the foregoing description of exemplary embodiments of the invention, the ink-jet recording head 11 that discharges ink drops is taken as an example for the purpose of explaining the concept of the invention. However, the invention can be applied to various kinds of liquid ejecting heads. Liquid ejecting heads to which the invention is applicable include, without any limitation thereto: a recording head that is used in an image recording apparatus such as a printer or the like, a color material ejection head that is used in the production of color filters for a liquid crystal display device or the like, an electrode material (i.e., conductive paste) ejection head that is used for the electrode formation of an organic EL display device or a surface/plane emission display device (FED, field emission display) and the like, a living organic material ejection head that is used for production of biochips.

What is claimed is:

1. A method for manufacturing a liquid ejecting head that has nozzle openings and ejects liquid supplied through a liquid supply passage from the nozzle openings, the manufacturing method comprising:

disposing a filtering member between a first supply member and a second supply member, the first supply member having one part of the liquid supply passage formed therein, the second supply member having another part of the liquid supply passage formed therein, the second supply member being disposed over one surface of the first supply member; and injecting a resin material over the one surface of the first supply member to cover a part of the second supply member for molding a fixation member and fixing the first supply member and the second supply member into a single-piece member as a result of the molding, wherein a convex portion is formed on a surface of the fixation member in the mold fixation of the first supply member and the second supply member, and a concave portion is formed in the surface of the fixation member in the mold fixation of the first supply member and the second supply member.

2. The method for manufacturing a liquid ejecting head according to claim 1, wherein the convex and the concave portions are formed concurrently with the molding of the fixation member.

3. The method for manufacturing a liquid ejecting head according to claim 1, wherein the convex and the concave portions are formed after the molding of the fixation member.

4. The method for manufacturing a liquid ejecting head according to claim 1, wherein the fixation member is molded in such a manner that the liquid supply passage only penetrates through the fixation member.

* * * * *